United States Patent Office 2,751,406
Patented June 19, 1956

---

2,751,406

OXIDATIVE CONDENSATION OF ARALKYL COMPOUNDS

Vladimir N. Ipatieff and Herman Pines, Chicago, Ill., assignors to Universal Oil Products Company, Chicago, Ill., a corporation of Delaware No Drawing. Application July 12, 1951,
Serial No. 236,458

4 Claims. (Cl. 260—465)

This invention relates to a process for oxidizing and condensing certain aromatic compounds, and particularly for oxidizing at least one aralkyl compound containing an aralkyl group combined with a member of the group consisting of

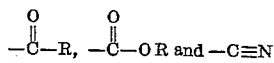

wherein R represents a hydrogen atom, an alkyl group, a cycloalkyl group and an aryl group to effect the formation of a di-aryl alkadione, a di-aryl alkandioic acid, a di-aryl alkandioic nitrile, etc.

An object of this invention is to produce a di-aryl alkadione.

Another object of this invention is to produce a di-aryl alkandioic acid.

A further object of this invention is to produce a di-phenyl alkadione.

A still further object of this invention is to produce a di-phenyl alkandioic acid.

An additional object of this invention is to produce 3,4-di-phenyl-2,5-hexadione.

A still additional object of this invention is to produce 2,3-di-phenyl succinic acid.

One embodiment of this invention relates to a process for producing at least one di-aryl compound represented by the formula:

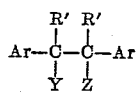

wherein Ar represents an aryl group, R' represents a member of the group consisting of hydrogen, an alkyl group, a cycoalkyl group and an aryl group, and each of Y and Z represents a member of the group consisting of

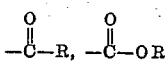

and —CN, wherein R represents a member of the group consisting of a hydrogen atom, an alkyl group, a cycloalkyl group and an aryl group which comprises reacting free oxygen with at least one aralkyl compound represented by one of the formulae:

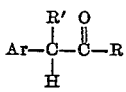 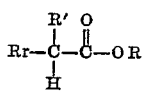

and

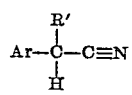

wherein Ar represents an aryl group, and R and R' each separately and independently represents a member of the group consisting of a hydrogen atom, an alkyl group, a cycloalkyl group and an aryl group, and recovering a di-aryl compound formed in the process.

Another embodiment of this invention relates to a process for producing a di-aryl alkadione which comprises reacting an aryl alkyl ketone with free oxygen and recovering the resultant di-aryl alkadione.

A further embodiment of this invention relates to a process for producing a di-aryl alkandioic acid which comprises reacting an aryl alkanoic acid with free oxygen and recovering the resultant di-aryl alkandioic acid.

A still further embodiment of this invention relates to a process for producing 3,4-di-phenyl-2,5-hexadione which comprises reacting phenylacetone with free oxygen and recovering the resultant 3,4-di-phenyl-2,5-hexadione.

A still additional embodiment of this invention relates to a process for producing 2,3-di-phenyl succinic acid which comprises reacting phenyl acetic acid with free oxygen and recovering the resultant 2,3-di-phenyl succinic acid.

Another embodiment of the invention relates to a process for producing a di-phenyl compound represented by the formula:

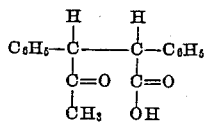

which comprises reacting free oxygen with a mixture of phenylacetone and phenyl acetic acid at a temperature of from about 80° to about 250° C., and recovering the resulting di-phenyl compound.

We have found that the treatment of certain aralkyl aldehydes, ketones, acids, esters and nitriles, with air, oxygen or free oxygen in admixture with an inert gas or with a mixture of inert gases results in the removal of a portion of the hydrogen from said aralkyl compound and the production of a di-(aralkyl) compound including particularly a di-aryl alkadione, a di-aryl alkandioic acid, and a nitrile of a di-aryl alkandioic acid as well as di-(aralkyl) compounds containing two different functional groups selected from an aldehyde group, a ketone group, a carboxylic acid group, a carboxylic acid ester group, and a nitrile group.

The aralkyl compounds suitable for use in this process contain at least one hydrogen atom combined with the carbon atom joined to the aromatic nucleus and represented by the formulae:

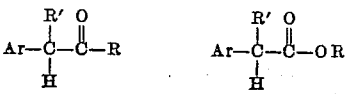

and

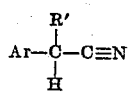

wherein Ar represents an aromatic hydrocarbon group, and R and R' each separately and independently represents a member of the group consisting of a hydrogen atom, an alkyl group, a cycloalkyl group and an aryl group.

In these aralkyl compounds, the aryl group may contain a benzene ring, a naphthalene ring or other polycyclic aromatic hydrocarbon ring, and this aromatic group also includes alkylated and cycloalkylated aromatic groups. Accordingly, aralkyl compounds which may be used as starting materials in this process include phenylacetone, phenyl acetaldehyde, phenyl acetic acid, esters of phenyl acetic acid, phenyl aceto nitrile, p-tolyl-acetone, naphthylacetone, naphthylaceto-nitrile, etc. These aralkyl compounds thus have a carbon atom in alpha position to the aromatic ring which is combined with at least one, but not more than two hydrogen atoms.

We have found that the above indicated aralkyl compounds which contained at least one hydrogen atom combined with a carbon atom in alpha position to the aromatic ring may be reacted with air, oxygen, or a mixture of an inert gas or gases and oxygen at a temperature of from about 80° to about 250° C. and preferably at a temperature of from about 125° to about 200° C. and at a pressure sufficient to maintain the aralkyl compound or mixture of aralkyl compounds in substantially liquid phase. In order to maintain an aralkyl compound or a mixture of two or more aralkyl compounds in liquid phase, it may be necessary to employ subatmospheric pressure, but generally not in excess of about 100 atmospheres. The gaseous oxidizing agent such as air or a mixture of inert gases and oxygen are then contacted with the liquid aralkyl compound or a mixture of such compounds in order to effect condensation to form di-(aralkyl) compounds as hereinabove set forth.

As an illustration of this process, we have found that by reacting phenylacetone with air at controlled conditions of temperature within the above indicated range, a reaction occurs whereby two molecular proportions of phenylacetone condense with or react with each other to form 3,4-di-phenyl-2,5-hexadione and water as illustrated by the following equation:

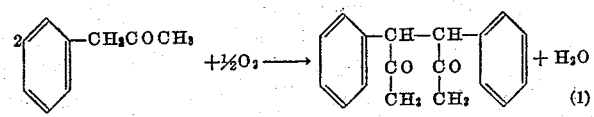

The above indicated oxidative condensation reaction may also be applied to other aralkyl ketones such as benzyl ethyl ketone. Such a reaction is illustrated by the following equation:

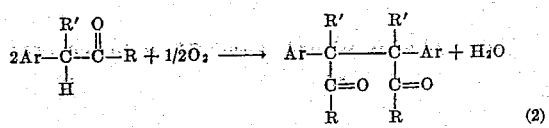

wherein R and R' each separately and independently represents a member of the group consisting of a hydrogen atom, an alkyl group, a cycloalkyl group, and an aryl group.

Similarly the oxidation treatment of an aryl alkanoic acid to produce a di-aryl alkandioic acid may be illustrated by the following equation which shows the conversion of phenyl acetic acid into 2,3-di-phenyl succinic acid.

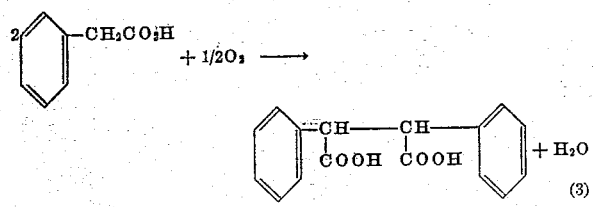

The process may be carried out in either batch or continuous types of operation. In a typical batch type operation, the aralkyl compound such as phenylacetone, phenyl acetaldehyde, phenyl acetic acid and phenyl acetonitrile, etc. is placed in a reactor heated to a temperature of from about 80° to about 250° C. and maintained at a pressure sufficient to keep a substantial proportion of the aromatic compound in liquid phase while air or another gas containing free oxygen is passed therethrough. Also the formation of a higher yield of desired di-(aralkyl) compound condensation products is promoted in the case of non acids by charging to the reactor a basic material simultaneously with the aromatic compound or compounds and oxygen containing gas being introduced thereto. Such a suitable basic material is $K_2CO_3$. Also the presence in the reactor of certain metals such as magnesium and aluminum promotes the formation of high yields of the desired condensation products.

In continuous operation, an aralkyl compound of the type herein indicated and air or oxygen or some other oxygen containing gas are passed through a heated reactor which may also contain one of the metals selected from the members of the group consisting of magnesium or aluminum and having atomic numbers of 12 and 13 and the resultant reaction products are then recovered and separated into the condensation products and unconverted starting materials, the latter being suitable for further treatment in the process.

The following examples are given to illustrate the type of results obtained in this process although the data presented are not introduced with the intention of restricting unduly the broad scope of the invention.

Example I 67 grams of phenylacetone was placed in a Pyrex distilling flask of 200 cc. capacity provided with a thermometer and a reflux condenser which was attached to a trap cooled by solid carbon dioxide and acetone. The flask and the phenylacetone contained therein were heated at a temperature of 184° C. for a time of 23 hours in the presence of ultraviolet light provided by a sun lamp. During this time of heating, about 3.6 grams of the phenylacetone was converted into higher boiling materials.

Example II

In another run similar to that referred to in Example I, 67 grams of phenylacetone was heated at a temperature of 180° C. for a time of 15 hours in the presence of ultraviolet light and air introduced through a calibrated flow meter at a rate of about 1 liter per hour. During this treatment approximately 13.8 grams (0.1 mol) or 20% of the phenylacetone which was charged reacted to form 5.2 grams of white crystalline product which upon recrystallization form absolute ethyl alcohol and normal pentane melted at a temperature of 105–107° C. This product when recrystallized from normal hexane melted at 106–107° C. and gave a positive iodoform reaction which indicated the presence of a

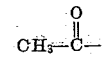

group. Analysis of the crystalline material corresponded to that expected for 3,4-di-phenyl-2,4-hexanedione, a result showing the condensation of 2 molecular proportions of phenylacetone such as that indicated above by Equation 1.

In addition to the crystalline 3,4-di-phenyl-2,4-hexanedione there was also obtained 5.8 grams of a resin-like material.

We claim as our invention:

1. A process for producing a condensation product of an aralkyl compound selected from the group consisting of phenylacetone, phenyl acetaldehyde, phenyl acetic acid, esters of phenyl acetic acid, phenyl aceto nitrile, p-tolylacetone, naphthylacetone, and naphthylacetonitrile, which comprises heating said compound in substantially liquid phase to a temperature of from about 80° to about 250° C. in the presence of free oxygen, and recovering the resultant condensation product.

2. A process for producing 3,4-di-phenyl-2,5-hexadione which comprises reacting phenylacetone in substantially liquid phase with free oxygen at a temperature of from about 80° to about 250° C., and recovering the resulting 3,4-di-phenyl-2,5-hexadione.

3. A process for producing 2,3-di-phenyl succinic acid which comprises reacting phenyl acetic acid in substantially liquid phase with free oxygen at a temperature of from about 80° to about 250° C. and recovering the resulting 2,3-di-phenyl succinic acid.

4. A process for producing a di-phenyl compound represented by the formula:

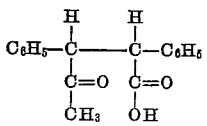

which comprises reacting free oxygen with a mixture of phenylacetone and phenyl acetic acid at a temperature of from about 80° to about 250° C. and sufficient pressure to maintain said mixture in substantially liquid phase, and recovering the resulting di-phenyl compound.

References Cited in the file of this patent

UNITED STATES PATENTS

| | | |
|---|---|---|
| 2,043,950 | De Simo et al. | June 9, 1936 |
| 2,341,288 | Pruckner | Feb. 8, 1944 |
| 2,524,319 | Kharasch | Oct. 3, 1950 |

OTHER REFERENCES

Waters: J. Chem. Soc. volume 1946, pages 1151–4.

Petit: Chem. Abstracts, volume 41, column 1604 (1947).

Mel'nikov et al.: Chem. Abstracts, vol. 41, column 5780 (1947).